United States Patent [19]
Ito et al.

[11] Patent Number: 5,357,750
[45] Date of Patent: Oct. 25, 1994

[54] METHOD FOR DETECTING DETERIORATION OF CATALYST AND MEASURING CONVERSION EFFICIENCY THEREOF WITH AN AIR/FUEL RATIO SENSOR

[75] Inventors: Yasuo Ito, Nagoya; Nobuhiro Hayakawa, Chita; Tessho Yamada, Nagoya, all of Japan

[73] Assignee: NGK Spark Plug Co., Ltd., Aichi, Japan

[21] Appl. No.: 1,225

[22] Filed: Jan. 6, 1993

Related U.S. Application Data

[63] Continuation-in-part of Ser. No. 684,077, Apr. 12, 1991, abandoned.

[30] Foreign Application Priority Data

Apr. 12, 1990 [JP] Japan ..................... 2-96935

[51] Int. Cl.$^5$ ................................. F01N 3/20
[52] U.S. Cl. ........................ 60/274; 60/276; 60/277
[58] Field of Search ................. 60/274, 276, 277

[56] References Cited

U.S. PATENT DOCUMENTS

| | | | |
|---|---|---|---|
| 3,969,932 | 7/1976 | Rieger | 60/277 |
| 4,622,809 | 11/1986 | Abthoff | 60/276 |
| 4,884,066 | 11/1989 | Miyata | 60/277 |

FOREIGN PATENT DOCUMENTS

| | | | |
|---|---|---|---|
| 63-205441 | 8/1988 | Japan . | |
| 63-231252 | 9/1988 | Japan . | |
| 45913 | 2/1989 | Japan | 60/276 |
| 2178857 | 2/1987 | United Kingdom | 60/276 |

*Primary Examiner*—Douglas Hart
*Attorney, Agent, or Firm*—Sughrue, Mion, Zinn, Macpeak & Seas

[57] ABSTRACT

The invention provides a method for accurately and precisely detecting deterioration of a catalyst and measuring a conversion efficiency of a catalyst for HC/CO/NOx by using an oxygen sensor and an air/fuel ratio sensor disposed on the upstream and downstream sides of the catalyst, respectively. The catalyst is determined to be deteriorating when an output amplitude of the air/fuel ratio sensor becomes greater than a predetermined value. The conversion efficiency of the catalyst is determined based on a predetermined relationship between the output amplitude and the mean converted rate of HC/CO/NOx.

9 Claims, 8 Drawing Sheets

1

METHOD FOR DETECTING DETERIORATION OF CATALYST AND MEASURING CONVERSION EFFICIENCY THEREOF WITH AN AIR/FUEL RATIO SENSOR

This is a continuation-in-part of application No. 07/684,077 filed Apr. 12, 1991, abandoned.

BACKGROUND OF THE INVENTION

The present invention relates to a method for detecting deterioration of a catalyst and measuring the conversion efficiency thereof with an air/fuel ratio sensor.

A conventional method detects deterioration of a catalyst based on the difference between the maximum output voltages of two oxygen sensors disposed on upstream and downstream sides of the catalyst (Japanese Published Unexamined Patent Application No. Sho-63-231252).

The output characteristic of an oxygen sensor changes abruptly around $\lambda=1$. In other words, as shown in FIG. 7, the waveform of the output switches between a lean air/fuel ratio and a rich air/fuel ratio with a steep slope and does not show an intermediate or mean value. Accordingly, in the conventional method for detecting deterioration of a catalyst with two oxygen sensors, processing of comparison data between the two waveforms is rather troublesome and complicated. Moreover, accurate and precise detection is difficult for a converted rate of lower than 70% as seen in FIG. 8.

SUMMARY OF THE INVENTION

One objective of the invention is thus to provide an improved method for detecting deterioration of a catalyst with sufficient accuracy.

Another objective of the invention is to provide an improved method for accurately and precisely measuring a wide range conversion efficiencies, i.e., 0 to 100%, of a catalyst.

The above and other related objectives are realized by a method for detecting deterioration of a catalyst, which includes the steps of:

(a) providing an oxygen sensor on an upstream side of a catalyst which converts harmful and toxic components of exhaust gas and an air/fuel ratio sensor on a downstream side of the catalyst; and (b) detecting deterioration of the catalyst when an output amplitude of the air/fuel ratio sensor becomes greater than a predetermined value.

Another feature of the invention is a method for measuring a conversion efficiency of a catalyst, which includes the steps of:

(a) providing an oxygen sensor on an upstream side of a catalyst which converts harmful and toxic components of exhaust gas and an air/fuel ratio sensor on a downstream side of the catalyst;

(b) measuring an output amplitude of the air/fuel ratio sensor; and (c) determining a mean converted ratio of the catalyst for three toxic components, HC, CO, and NOx, of exhaust gas based on a predetermined relationship between the output amplitude and the mean converted rate of HC, CO, and NOx.

The output amplitude is generally a voltage amplitude, but it may be a corresponding current amplitude.

The oxygen sensor provided on the upstream side of the catalyst feeds information back corresponding to the variation of driving conditions, thus maintaining an air/fuel ratio close to stoichiometric or $\lambda=1$. The amplitude of the waveform of its output voltage is thus held constant.

The output of the air/fuel ratio sensor provided on the downstream side of the catalyst is a curve with a gentle slope showing a relationship between the air/fuel ratio and the output characteristic as shown in FIG. 6. The waveform of the output of the air/fuel ratio sensor does not change abruptly around the air/fuel ratio of 14.6 like the conventional oxygen sensors. As seen in FIG. 3, the amplitude of its output voltage varies, for example, from $a_1$ in a waveform A to zero in an approximately linear waveform B the linearity of the waveform indicates that the conversion efficiency of the catalyst is 100%) corresponding to the degree of deterioration of the catalyst.

An approximately linear relationship exists between the output amplitude of the air/fuel ratio sensor and the mean converted rate of HC/CO/NOx in exhaust gas as shown in FIG. 4. The conversion efficiency of the catalyst for HC/CO/NOx is then determined based on the relationship above. Accordingly, the method of the invention accurately and precisely detects a conversion efficiency of the catalyst.

BRIEF DESCRIPTION OF THE DRAWINGS

The invention may be best understood by referring to the following detailed description of the preferred embodiment and the accompanying drawings, wherein like numerals denote like elements and in which.

DETAILED DESCRIPTION OF THE PREFERRED EMBODIMENT

Figure 1:
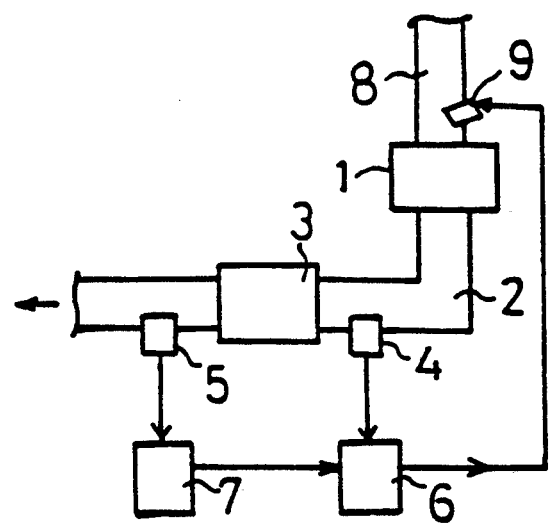
FIG. 1 is a block diagram illustrating the main concept of the invention.

A preferred embodiment of the invention is now explained in detail referring to the drawings.

(1) Structure of Apparatus

Figure 2:
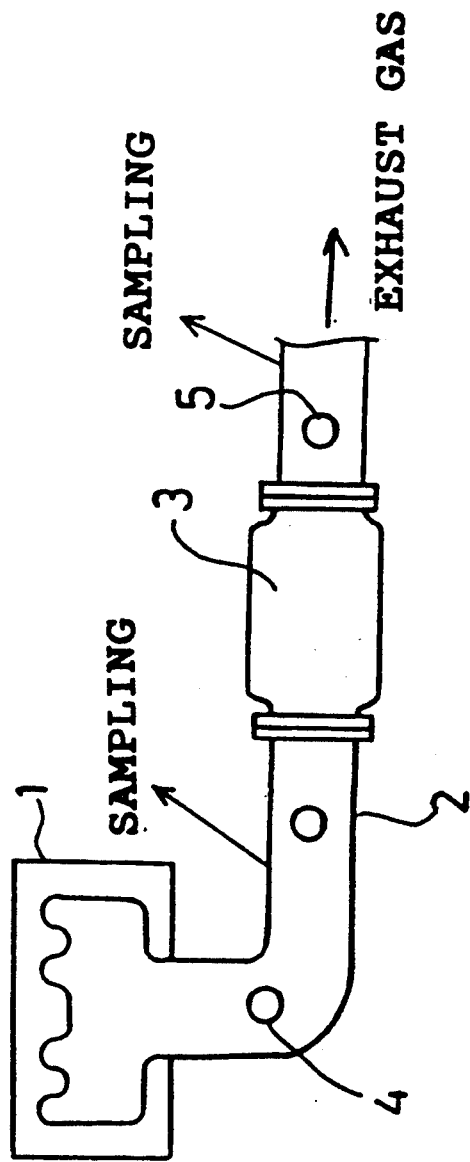
FIG. 2 is a schematic view illustrating an air/fuel ratio measuring apparatus embodying the invention.

FIG. 1 is a block diagram illustrating an air/fuel ratio measuring apparatus for an internal combustion engine, which is used for detecting deterioration of a catalyst and measuring a conversion efficiency thereof. FIG. 2 is a schematic view illustrating the locations of an oxygen sensor and an air/fuel ratio sensor in the apparatus.

As shown in FIGS. 1 and 2, a three-way catalyst 3 is provided in an exhaust manifold 2 of an internal combustion engine 1. An oxygen sensor or control $\lambda$ sensor 4 and an air/fuel ratio sensor 5 are respectively disposed on the upstream and downstream sides of the three-way catalyst 3 in the exhaust manifold 2. The oxygen and air/fuel ratio sensors 4 and 5 are electrically connected to an electronic control unit 6 and a sensor control unit 7 for detecting sensor output, respectively. The electronic control unit 6 is electrically connected to a fuel injection valve 9 disposed in an intake manifold 8 of the internal combustion engine 1 and controls fuel injection through the fuel injection valve 9 based on the output voltage of the oxygen sensor 4. Information on sensor output is fed back from the electronic control unit 6 to maintain both the air/fuel ratio and the sensor output amplitude constant.

Figure 5:
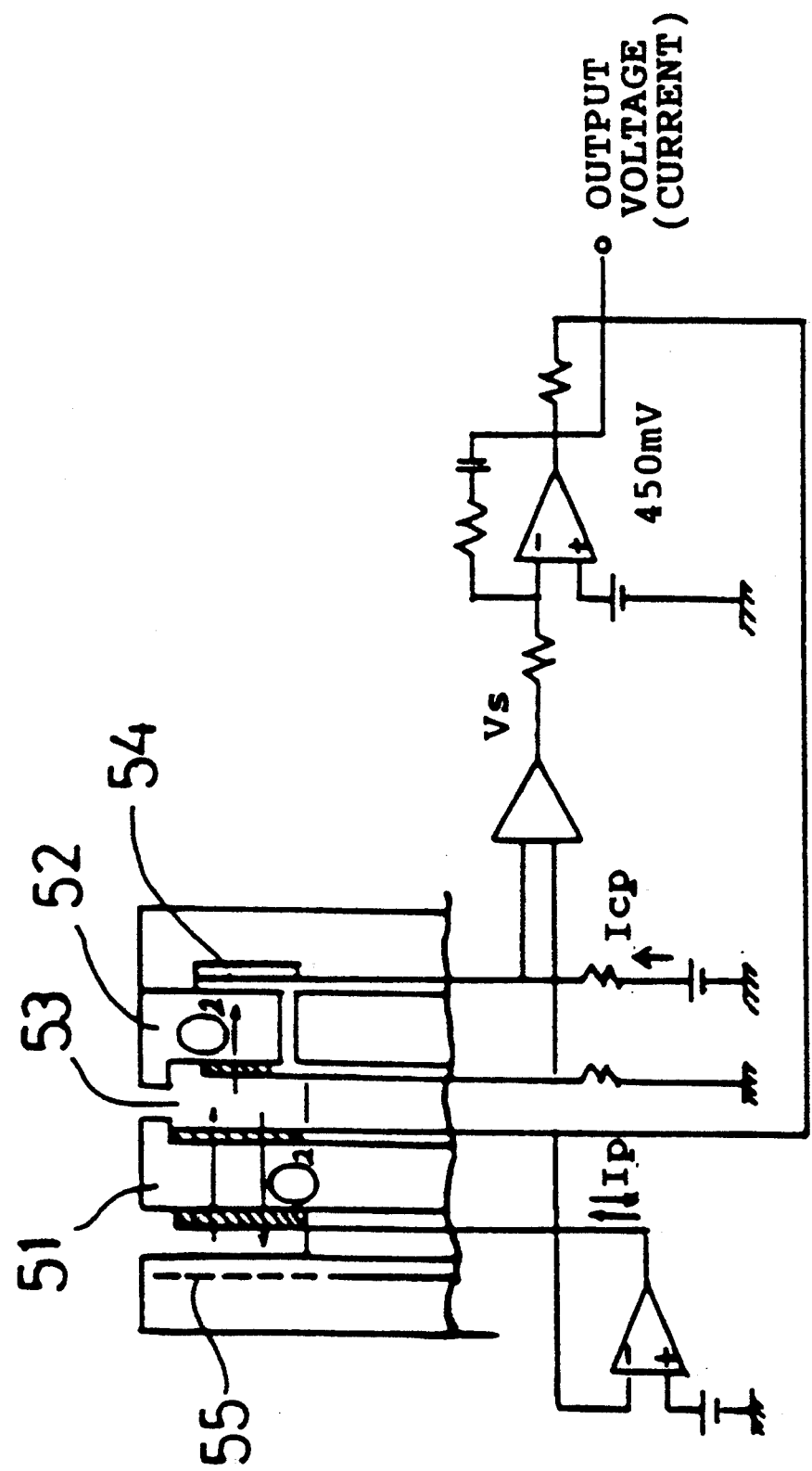
FIG. 5 is an explanatory view illustrating the principle of the air/fuel ratio sensor used in the embodiment.
Figure 6:
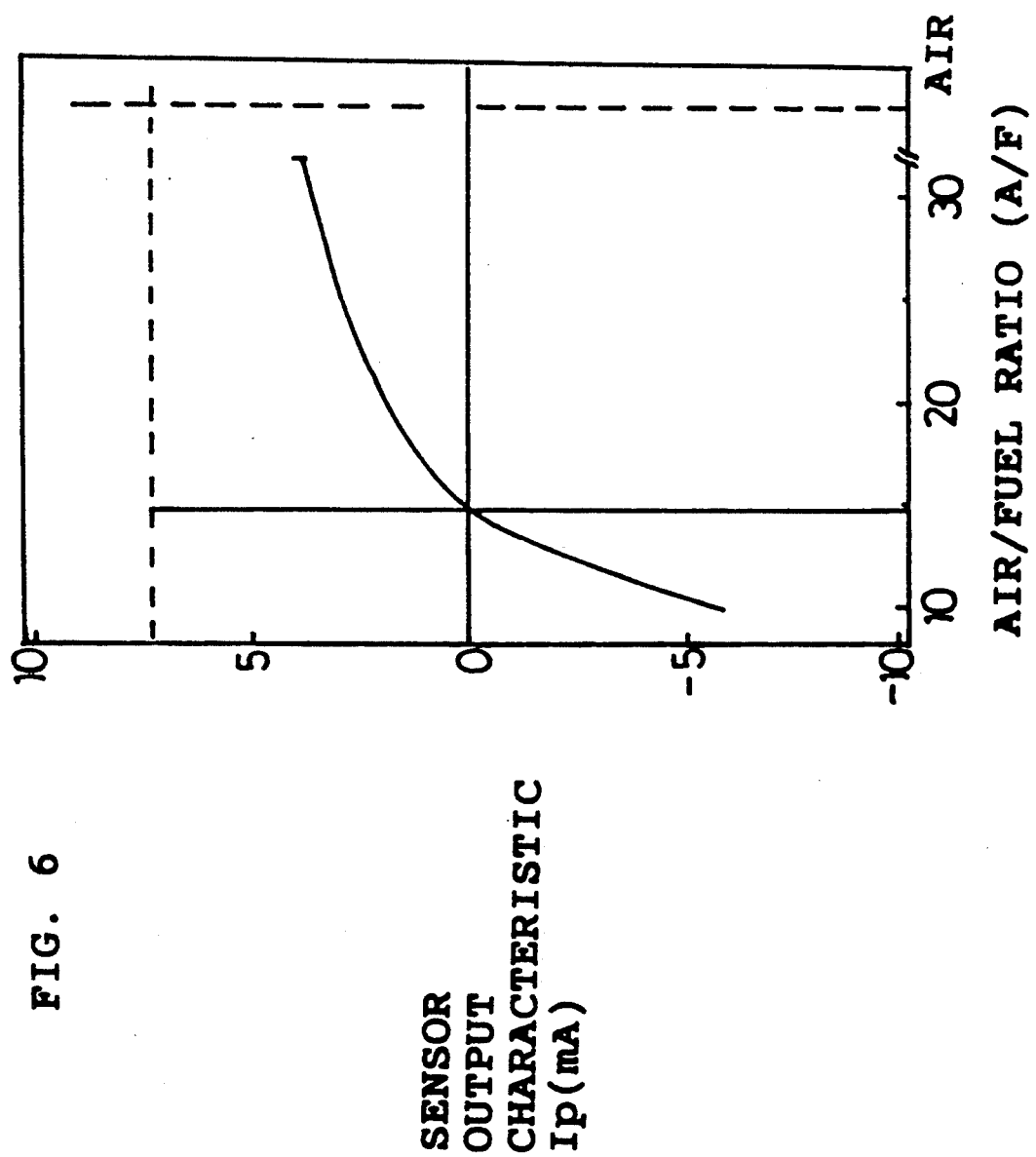
FIG. 6 is a graph showing a relationship between the air/fuel ratio and the output characteristic in the air/fuel ratio sensor of FIG. 5.
Figure 7:
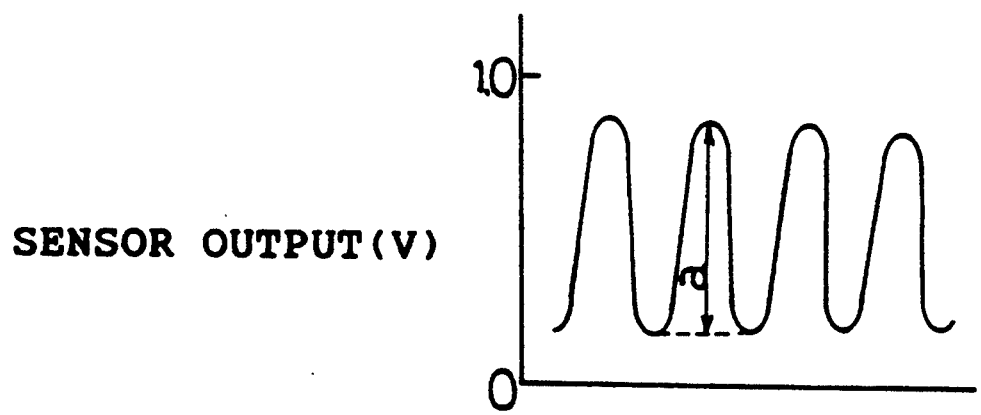
FIG. 7 is a graph showing a waveform of output from an oxygen sensor for reference.

The air/fuel ratio sensor 5 may be any conventional type. The principle of the air/fuel ratio sensor 5 is explained according to FIG. 5. An oxygen partial pressure of exhaust gas flown into a diffusion chamber 53 formed between an Ip cell 51 and a Vs/Icp cell 52 is held constant with a pump. An output current or output voltage is read, which is required for maintaining a constant voltage (for example, 450 mV in FIG. 5). The voltage is attributable to the difference between oxygen partial pressures in the diffusion chamber 53 and in an oxygen reference room 54. Component 55 in FIG. 5 denotes a heater.

The oxygen sensor 4 may be any conventional type, but is preferably a zirconia or titania oxygen sensor.

Another oxygen sensor may be disposed instead of the air/fuel ratio sensor 5 on the downstream side of the three-way catalyst 3 in the exhaust manifold 2 for reference.

Figure 3:
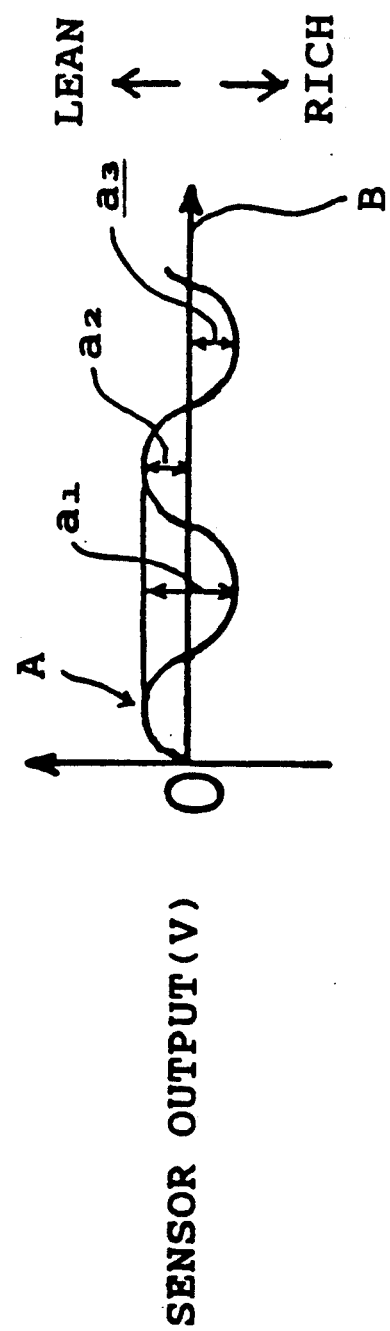
FIG. 3 is a graph showing waveforms of output from the air/fuel ratio sensor of FIG. 2.

The three way catalyst 3 may be any conventional type containing Pt, Rh, and, Pd. The catalyst 3 may be a monolith such as a honeycomb or a particle such as a pellet, cylinder, or ball in shape. (2) Measure of a Mean Conversion Efficiency of a Catalyst for HC/CO/NOx and Detection of Deterioration of the Catalyst An output amplitude $a_1$ of the air/fuel ratio sensor 5 is measured against various converted rates of HC/CO/NOx under certain engine operating conditions (1.5 L×4 cylinders; engine speed: 1,900 rpm; booster pressure: −400 mmHG). The relationship obtained makes a calibration curve. When a new catalyst is used, as shown in FIG. 3, the sensor 5 gives an approximately linear waveform B indicating almost 100% conversion efficiency. On the other hand, when a deteriorating catalyst is used, the sensor 5 gives a waveform A which has a certain output amplitude corresponding to the degree of deterioration. Each component of exhaust gas, i.e., hydrocarbons (HC), carbon monoxide (CO), or nitrogen oxides (NOx), sampled at the two locations shown in FIG. 2, is determined with an analyzer. The converted rate of HC/CO/NOx is calculated based on the determination of each component.

Figure 4:
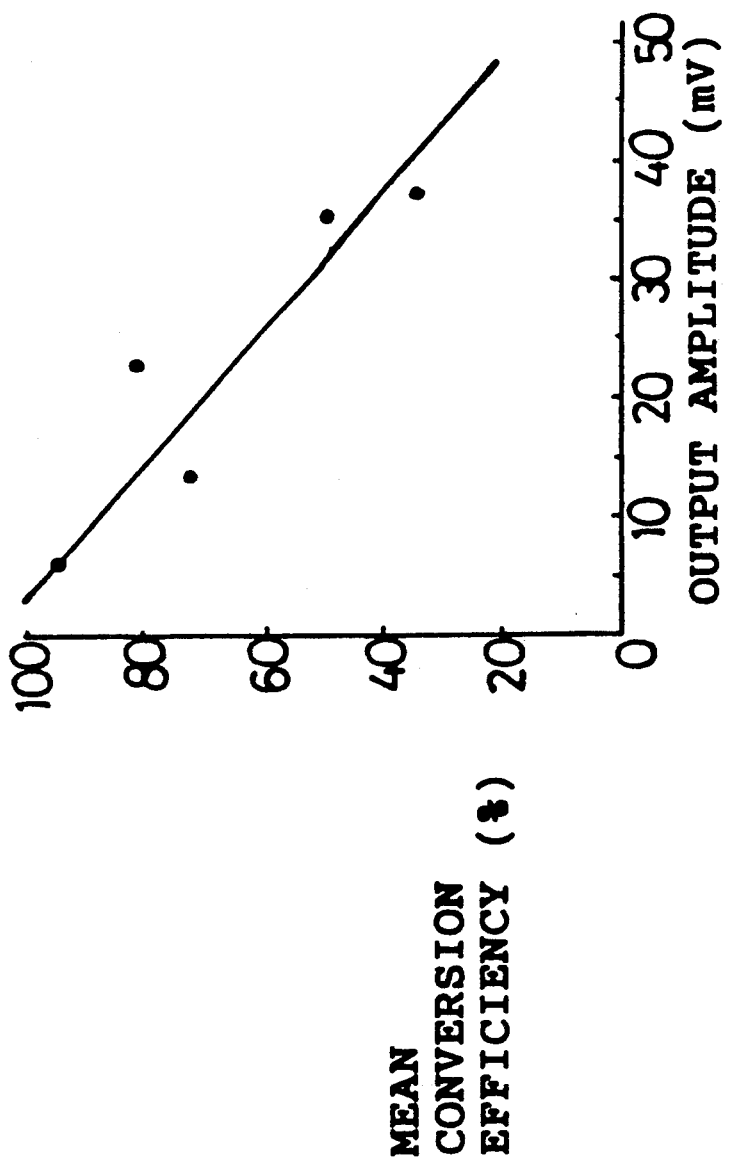
FIG. 4 is a graph showing a relationship between the output amplitude and the mean converted rate of HC/CO/NOx.

An approximately linear relationship exists between the output amplitude and the mean converted rate of HC/CO/NOx of greater than 30% as shown in FIG. 4. Deterioration of the catalyst is readily and accurately determined based on this relationship. Namely, when the output amplitude becomes greater than a predetermined value, the catalyst is determined to be deteriorating. The predetermined value can be set according to any desired objectives and/or regulations related to the efficiency of the catalytic converter. For example, the United States is presently considering an exhaust gas control bill referred to as the Onboard Diagnostic System II bill. Under the terms of that bill, if passed, efficiency of the HC would have to be 40–50% or higher. Thus, the predetermined value described above could be set to that level to assure compliance with the regulation.

In an internal combustion engine, an air/fuel ratio (a/f) sensor 5 is placed downstream of a catalytic converter 3. An oxygen sensor 4 is placed upstream thereof. The upstream sensor 4 senses the a/f of the exhaust before it reaches the converter 3 and the downstream sensor senses the a/f of the exhaust after it passes through the converter. The upstream oxygen sensor 4 determines whether exhaust gas is rich or lean by making a comparison of the input exhaust gas with a predetermined value, as is well-known in the art. The determination made by the oxygen sensor 4 is then used in a feedback-type arrangement so that the fuel injection valve 9 can be made to output an amount of fuel so as to maintain a perfect balance between the air and the fuel in the engine.

When the converter 3 is new, the output voltage of the downstream a/f sensor will not substantially vary over time because the converter has taken out almost all of the harmful chemicals in the exhaust. However, when the converter has been used for quite awhile, the performance of the converter will deteriorate and the output voltage of the downstream a/f sensor will begin to vary with time because the converter is not eliminating as much of the harmful chemicals from the exhaust as it was when the converter was new. In particular, at lean a/f values, the downstream sensor output will reach positive voltage values, and at rich a/f values, the downstream sensor will reach negative voltage values.

The determination made by the oxygen sensor 4 as to whether the a/f of the exhaust is rich or lean is used for a secondary purpose, in the present invention, besides the feedback purpose described above with respect to the fuel injection valve 9. That is, the determination made by the oxygen sensor 4 is also used to indicate whether the downstream sensor 5 is being used to determine the conversion rate of $NO_x$, on the one hand, or of HC or CO on the other hand.

Specifically, $NO_x$ is the gas which is dominantly present in exhaust gas at lean a/f values. An approximately linear relationship exists between the converted rate of $NO_x$ and the positive output amplitude $a_2$ of FIG. 3 of the downstream a/f sensor 5.

Accordingly, the conversion efficiency of the catalytic converter 3 for $NO_x$ is readily and accurately determined from the nearly linear relationship mentioned above. Deterioration of the catalyst for $NO_x$ is also determined based on the nearly linear relationship. Namely, when the output amplitude of sensor 5 becomes less than a predetermined value, the catalyst is determined to be deteriorating.

The gases HC and CO are dominant in exhaust gas at rich a/f values. An approximately linear relationship exists between the converted rate of HC and CO and the negative output amplitude $a_3$ of the downstream a/f sensor 5.

Accordingly, the conversion efficiency of the catalyst 3 for HC/CO is readily and accurately determined from the nearly linear relationship mentioned above. Deterioration of the catalyst 3 for HC/CO can also be determined by determining when the absolute value of the output amplitude of sensor 5 becomes less than a predetermined value.

Thus, the output of the oxygen sensor 4, which indicates whether the exhaust input to sensor 4 is rich or lean, can be used in the following way.

If the oxygen sensor 4 indicates that the exhaust gas is lean, then the a/f sensor 5 determines the conversion rate of $NO_x$. If the oxygen sensor 4 indicates that the exhaust gas is rich, then the a/f sensor 5 determines the conversion rate of HC/CO.

The relationship between the mean converted rate and the output amplitude of the air/fuel ratio sensor varies depending on the engine speed, load, or other conditions. When these data regarding the above relationship are input in the sensor control unit 7, deterioration of the catalyst is more accurately detected irrespective of the variation of the relationship.

The conversion efficiency of the catalyst is also calculated from the approximately linear relationship between the output amplitude and the mean converted rate. Although FIG. 4 shows the converted rate of higher than 30%, the residual area, i.e., 0 to 30% is also detectable. Namely, the method is applicable to virtually any conversion efficiency, i.e., 0 to 100%, of the catalyst.

Figure 8:
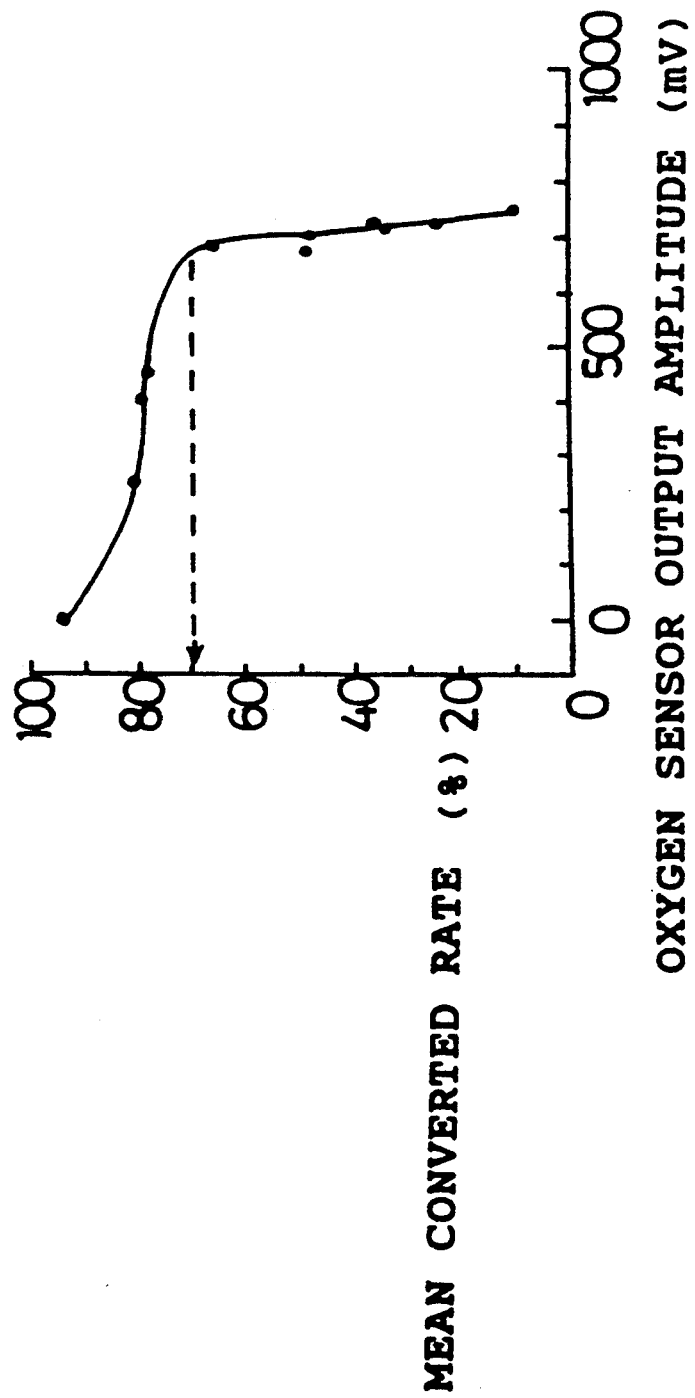
FIG. 8 is a graph showing a relationship between the output amplitude and the mean converted rate in the oxygen sensor of FIG. 7.

A relationship between the output amplitude of the conventional oxygen sensor and the mean converted rate may also be obtained. In the conventional method with two oxygen sensors, the conversion efficiency of less than 70% is not accurately detectable as shown in FIG. 8.

Since there may be various modifications and changes without departing from the scope of the invention, the embodiment above is not intended to limit the invention to the embodiment but is intended to illustrate in the invention more clearly.

As described above, the method is useful for detecting deterioration of a catalyst readily and accurately by comparing an output amplitude of the air/fuel ratio sensor with a predetermined value.

Furthermore, the method of the invention readily, accurately and inexpensively determines the conversion efficiency of a catalyst without any bulky and complicated apparatus. The method of the invention simultaneously detects deterioration of a catalyst and measures a conversion efficiency thereof and is thus more useful and practical than the conventional method with two oxygen sensors. Especially, the method is applicable to virtually any conversion efficiency, i.e., 0 to 100%, while the conventional method can only detect the conversion efficiency of 70% or above with sufficient accuracy.

What is claimed is:

1. A method for measuring the conversion rate of a catalyst which converts harmful and toxic components of exhaust gas of an internal combustion engine, the method being able to measure the conversion rate of component gases, $NO_x$, CO and HC, of the exhaust gas, the method comprising the steps of:
   (a) providing an oxygen sensor on the upstream side of said catalyst and an air/fuel ratio sensor on a downstream side of the catalyst;
   (b) measuring the output amplitude of the air/fuel ratio sensor; and
   (c) comparing a predetermined said mean conversion rate of HC, CO, and $NO_x$ with the output amplitude of said air/fuel ratio sensor to determine a mean conversion rate of the catalyst for $NO_x$ when said oxygen sensor determines that the exhaust gas is lean and for HC or CO when said oxygen sensor determines that the exhaust gas is rich.

2. A method as claimed in claim 1, in which the oxygen sensor and the air/fuel ratio sensor are electrically connected to an electronic control unit and a sensor control unit, respectively.

3. A method as claimed in claim 2, in which the electronic control unit feeds back information to the oxygen sensor.

4. A method as claimed in claim 1, in which the oxygen sensor and the air/fuel ratio sensor are disposed in an exhaust manifold of an internal combustion engine.

5. A method as claimed in claim 2, in which the electronic control unit is electrically connected to a fuel injection valve disposed in an intake manifold of an internal combustion engine.

6. A method as claimed in claim 1, in which the oxygen sensor is selected from the group consisting of a zirconia oxygen sensor and titania oxygen sensor.

7. A method as claimed in claim 1, in which the catalyst is a three-way catalyst containing Pt, Rh, and Pd.

8. A method as claimed in claim 1, in which the catalyst is selected from the group consisting of a monolith like a honeycomb, and a particle like a pellet, cylinder, or ball in shape.

9. A method for measuring a converted rate of a catalyst which converts harmful and toxic components of exhaust gas of an internal combustion engine, the method allowing for a determination to be made of the converted rate of particular component gases, NOx, CO and HC, of the exhaust gas converted by the catalyst, the method including the steps of:
   (a) producing a nearly linear diagram graphically relating the output of an air/fuel ratio detector located downstream of the catalyst with a predetermined mean converted rate of HC, CO and NOx;
   (b) determining whether exhaust gas input to the catalyst is rich or lean in air/fuel ratio, based on the output of an oxygen sensor located upstream of the catalyst;
   (c) measuring the output amplitude of said air/fuel ratio detector located downstream of said catalyst;
   (d) using the diagram obtained in step (a), matching the amplitude obtained in step (c) with the diagram obtained in step (a) and finding a corresponding converted rate from the diagram based on the matching;
   (e) determining that the converted rate obtained in step (d) is the converted rate of the $NO_x$ component gas of the exhaust gas when said oxygen sensor located upstream of the catalyst determines that the exhaust gas is lean; and
   (f) determining that the converted rate obtained in step (d) is the converted rate of either the HC or CO component gases of the exhaust gas when said oxygen sensor located upstream of the catalyst determines that the exhaust gas is rich.

* * * * *